UNITED STATES PATENT OFFICE.

ISAAC TYSON, JR., OF BALTIMORE, MARYLAND.

IMPROVED ARTICLE OF PAINT.

Specification forming part of Letters Patent No. 32,491, dated June 4, 1861.

*To all whom it may concern:*

Be it known that I, ISAAC TYSON, Jr., of the city and county of Baltimore, State of Maryland, have invented or discovered a new and useful Manufacture of Paint or Composition for Painting; and I do hereby declare that the same is described in the following specification.

To enable others skilled in the art to make and use my new manufacture of paint or composition for painting, I will proceed to describe the best mode known to me of mixing or preparing it for use.

The principal substance which I use in forming my new paint composition is a mineral or earthy deposit called by miners technically "black dirt." It is of a dark-brown color, and composed of the oxides of manganese and iron, silica, alumina, and generally of one per cent. or more of oxide of copper. It is found about or at the "Old Liberty Copper Mines" in Frederick county, Maryland, where it sometimes forms the nucleus of sulphuret, green oxide, and carbonate of copper. When taken from about the mines above mentioned it is in powder or pulverized, and generally mixed with pieces of slate, silica, and copper ore, the coarser parts of which may be separated from the finer by sifting or otherwise or by washing, and when separated by the latter mode the finest portion may be dried in kilns or otherwise, when it may be mixed with linseed, rosin, or such other oils as are in use for painting, and when so mixed it forms a good paint of a dark-brown color, well suited for many articles, and may be sold to profit at a small price; or, instead of being mixed with oil, as above stated, it may be previously calcined in a reverberatory furnace, or otherwise, either with or without carbonaceous matter, so as to make it darker in color, of which various shades may be obtained. When prepared in this way it may be mixed with oil by passing it through a paint-mill or otherwise, when it is ready for use, and for most common purposes may be used without any of the ordinary drying mixtures if it is allowed a little more time to dry and harden, forming a very cheap and durable paint for wood, iron, brick, stone, paper, canvas, or other substances, rendering those which are combustible without it in a measure fire-proof.

The color of my new composition for painting may be modified or varied by mixing white lead, zinc, ocher, or such other substances as are ordinarily used for changing or varying the coolrs of paint compounds.

I believe I have described my new manufacture of paint or composition for painting so as to enable any person skilled in the art to prepare and use it.

I will now state what I desire to secure by Letters Patent, to wit:

The new article of manufacture, being a composition suitable for painting, to wit: a composition consisting of the above-mentioned black dirt and oil, so mixed as to form a paint, which may be used either with or without the addition of other materials to make it dry or vary its color.

ISAAC TYSON, JUN.

Witnesses:
JOHN E. RIDGEWAY,
DANL. HALPIN.